United States Patent
Yoon et al.

(10) Patent No.: US 9,727,204 B2
(45) Date of Patent: Aug. 8, 2017

(54) REARRANGING CHAT MESSAGES

(71) Applicant: Samsung Electronics Co., Ltd., Gyeonggi-do (KR)

(72) Inventors: Piljoo Yoon, Gyeonggi-do (KR); Sooji Hwang, Gyeonggi-do (KR); Jinhong Jeong, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 379 days.

(21) Appl. No.: 14/475,728

(22) Filed: Sep. 3, 2014

(65) Prior Publication Data
US 2015/0074555 A1 Mar. 12, 2015

(30) Foreign Application Priority Data
Sep. 12, 2013 (KR) .................. 10-2013-0109537

(51) Int. Cl.
| | | |
|---|---|---|
| G06F 3/0481 | (2013.01) | |
| G06F 3/0484 | (2013.01) | |
| H04L 12/18 | (2006.01) | |
| G06Q 10/00 | (2012.01) | |

(52) U.S. Cl.
CPC ...... *G06F 3/04817* (2013.01); *G06F 3/04842* (2013.01); *G06Q 10/00* (2013.01); *H04L 12/1813* (2013.01)

(58) Field of Classification Search
CPC . G06F 3/00; G06F 3/041; G06F 3/048; G06F 3/0481; G06F 3/0484; G06F 3/0488; G06F 3/04817; G06F 9/4443; G06F 7/06; G06F 15/16; H04L 12/18; H04L 12/58; H04L 51/04
See application file for complete search history.

(56) References Cited

U.S. PATENT DOCUMENTS

| | | | | |
|---|---|---|---|---|
| 7,734,695 | B2 * | 6/2010 | Kelley ................. | G06Q 10/107 709/205 |
| 8,001,184 | B2 * | 8/2011 | Etgen ................... | G06Q 10/107 709/204 |
| 8,166,408 | B2 * | 4/2012 | Castellucci .......... | G06Q 10/107 715/733 |
| 2003/0212746 | A1 * | 11/2003 | Fitzpatrick .......... | H04L 12/1827 709/206 |
| 2005/0223057 | A1 * | 10/2005 | Buchheit ............. | G06Q 10/107 709/203 |
| 2006/0026252 | A1 * | 2/2006 | Caspi ................... | G06Q 10/107 709/207 |
| 2006/0271630 | A1 * | 11/2006 | Bensky ................ | G06Q 10/107 709/206 |
| 2007/0214216 | A1 * | 9/2007 | Carrer ................. | H04L 12/1827 709/204 |

(Continued)

FOREIGN PATENT DOCUMENTS

| | | | |
|---|---|---|---|
| KR | 10-2006-0063616 A | | 6/2006 |
| KR | 10-2010-0007228 A | | 1/2010 |

(Continued)

*Primary Examiner* — Xiomar L Bautista
(74) *Attorney, Agent, or Firm* — Cha & Reiter, LLC.

(57) ABSTRACT

Disclosed are a method of arranging messages and a device for supporting the same. A display is rearranged such that a first chat message and a second chat message are displayed consecutively, when a third chat message is displayed after the first chat message.

20 Claims, 10 Drawing Sheets

(56) References Cited

U.S. PATENT DOCUMENTS

| | | | |
|---|---|---|---|
| 2008/0144784 A1* | 6/2008 | Limberg | G06Q 10/107 379/88.14 |
| 2010/0011317 A1 | 1/2010 | Lee | |
| 2010/0211646 A1* | 8/2010 | McDevitt | G06Q 10/107 709/206 |
| 2012/0124147 A1* | 5/2012 | Hamlin | H04L 51/36 709/206 |
| 2012/0210334 A1* | 8/2012 | Sutedja | G06Q 10/107 719/314 |
| 2014/0379818 A1* | 12/2014 | Cudak | H04L 51/16 709/206 |

FOREIGN PATENT DOCUMENTS

| KR | 10-2010-0017022 A | 2/2010 |
|---|---|---|
| KR | 10-2012-0082154 A | 7/2012 |

\* cited by examiner

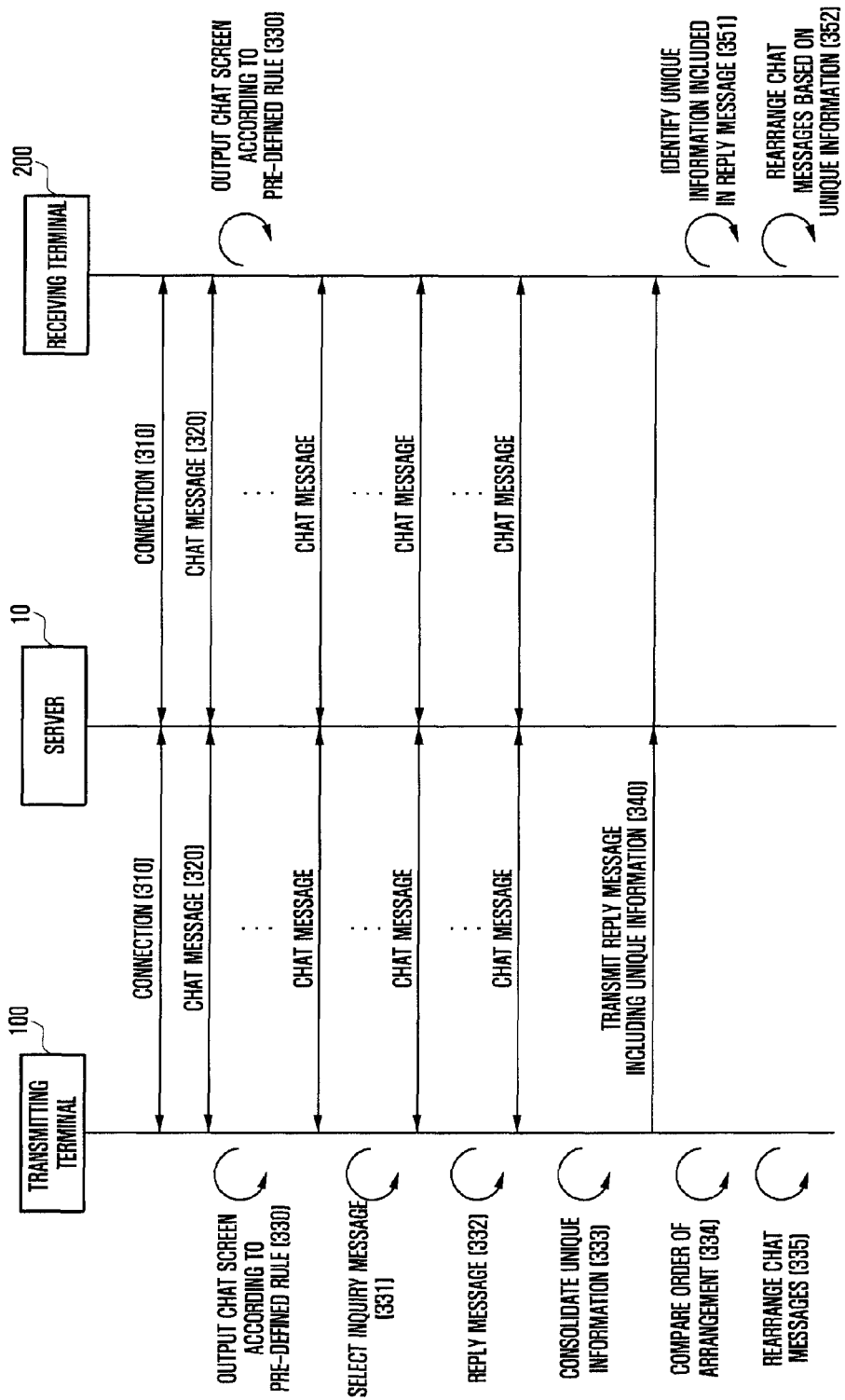

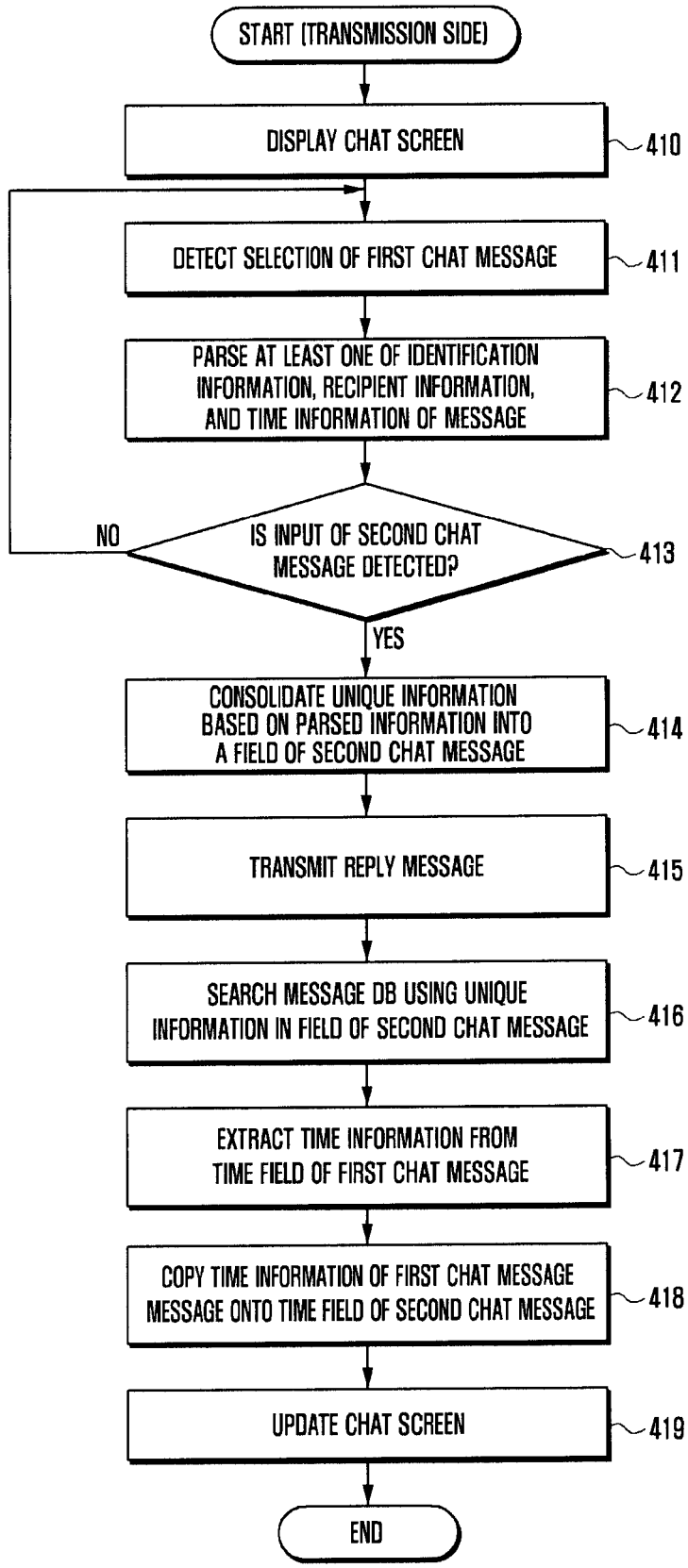

REARRANGING CHAT MESSAGES

CROSS-REFERENCE TO RELATED APPLICATION

This application claims priority from and the benefit under 35 U.S.C. §119(a) of Korean Patent Application No. 10-2013-0109537, filed on Sep. 12, 2013, which is hereby incorporated by reference herein.

BACKGROUND

1. Technical Field

The present disclosure relates to a method of arranging messages and a device for supporting the same. More particularly, the present disclosure relates to a method and device for arranging a chat message based on a context of another chat message.

2. Description of the Prior Art

Mobile terminals such as smart phones, tablet PCs, and the like are being used in a wide variety of fields due to its convenience and portability. With the recent development of various communication networks, the use of messenger services capable of transferring information between terminals in real time has spread considerably. Messenger services heretofore are capable of instantly showing both transmitted and received messages on the same screen.

SUMMARY

Instant messengers permit chat participants to send and receive chat messages in real time. Furthermore, chat participants may input chat messages at anytime and the chat messages may be ordered on the display based on a time in which each message was received. However, ordering the chat messages based on receipt time may cause some chat messages to be displayed out of context. For example, a first chat message may be relevant to a particular topic. Meanwhile, other chat messages relevant to other topics may be received and displayed in the interim; then, a second chat message replying to the first chat message may be received and displayed. In this instance, it may be difficult to place the second chat message within the context of the first chat message, since the second chat message may be displayed in an area of the screen that is removed from the first chat message.

In view of the foregoing, aspects of the present disclosure provide a method and device for arranging messages.

In one aspect of the present disclosure, a method for arranging chat messages is provided. Such a method may include: detecting a selection of a first chat message displayed on a chat screen; consolidating information unique to the first chat message into a data field; generating a second chat message in reply to the first chat message such that the second chat message contains the data field; and rearranging a display such that the first chat message and the second chat message are displayed consecutively, when a third chat message is displayed after the first chat message.

In a further aspect of the present disclosure, another method of arranging messages is provided. Such a method may include: displaying a first chat message; detecting receipt of a second chat message; identifying whether a data field of the second chat message comprises information unique to the first chat message; identifying whether a third chat message is displayed after the first chat message; and rearranging a display such that the first chat message and the second chat message are displayed consecutively, when the data field comprises the information unique to the first chat message and the third chat message is displayed after the first chat message.

In yet another aspect of the present disclosure, a device for displaying chat messages is provided. Such a device may include at least one processor to: detect a selection of a first chat message displayed on a chat screen; consolidate information unique to the first chat message into a data field; generate a second chat message in reply to the first chat message such that the second chat message contains the data field; and rearrange a display such that the first chat message and the second chat message are displayed consecutively, when a third chat message is displayed after the first chat message.

In a further aspect, another device for displaying chat messages is provided. Such device may include at least one processor to display a first chat message; detect receipt of a second chat message; identify whether a data field of the second chat message comprises information unique to the first chat message; identify whether a third chat message is displayed after the first chat message; and rearrange a display of the device such that the first chat message and the second chat message are displayed consecutively, when the data field comprises the information unique to the first chat message and the third chat message is displayed after the first chat message. In another example of the device, at least one processor may search for the first chat message based on the data field containing information unique to the first chat message.

Therefore, the present disclosure provides a method and device for rearranging chat messages so that related messages are displayed consecutively, notwithstanding the time in which the messages were created. In turn, chat participants may be able to discern the context of a chat message without having to search through all the chat messages in the group chat session.

BRIEF DESCRIPTION OF THE DRAWINGS

The above features and advantages of the present disclosure will be more apparent from the following detailed description in conjunction with the accompanying drawings, in which:

FIG. 3 illustrates an example signal flow in accordance with aspects of the present disclosure;

FIG. 4A and FIG. 4B are flowcharts illustrating an example method of arranging messages in accordance with aspects of the present disclosure;

DETAILED DESCRIPTION

Figure 1:
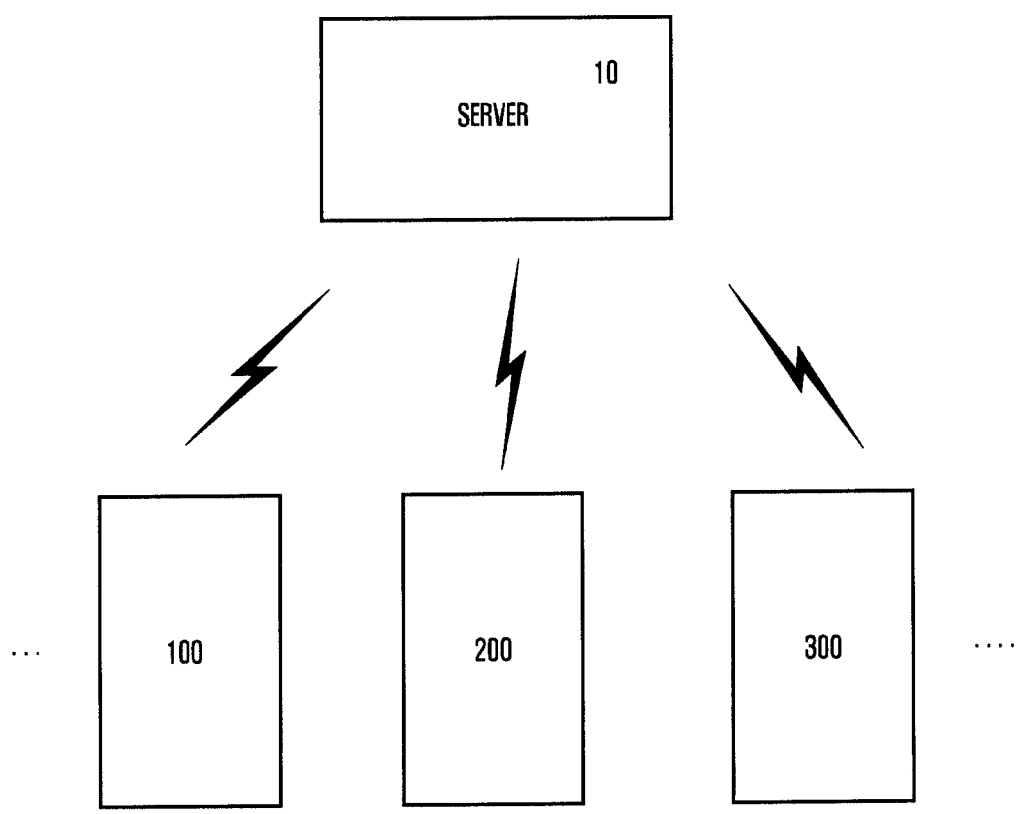
FIG. 1 is a block diagram of an example system supporting an instant message function in accordance with aspects of the present disclosure.

Hereinafter, examples of the present disclosure will be described with reference to the accompanying drawings. The terms and words used in the specification and appended claims should not be construed as limited to the common or lexical definitions, and should be interpreted as definitions and conceptions corresponding to the spirit and scope of the present disclosure based on the principle that inventors may pertinently define terms to describe their techniques as best as possible. Accordingly, it should be understood that the examples described in the specification and the configurations disclosed in the drawings are merely examples and that various modifications and variations to the disclosure may be made.

Hereinafter, configurations associated with the functions of the present disclosure and their roles will be described in more detail. However, the features of the present disclosure shall not be limited to the these configurations. That is, it should be appreciated that the features of the present disclosure cover modifications, equivalents, and/or additional functions.

FIG. 1 is a block diagram of an example message transmitting system. A message transmitting system may include a message server 10 and one or more terminals 100, 200, and 300. The terminals 100, 200, and 300 may be networked with the message server 10. Although not illustrated in FIG. 1, the message server 10 and the terminals 100, 200, and 300 may include a network device for supporting data transmission/reception. In the example system of FIG. 1, the terminals 100, 200, and 300 may transmit/receive chat messages to/from other terminals through the message server 10.

In one example, the chat messages transmitted/received to/from other terminals may be assigned an identifier (ID) during the transmission/reception process. The ID may be assigned by the message server 10 and may be unique to each message. Alternatively, the ID may be assigned by the terminals. In particular, when the message server 10 assigns an ID to a chat message, the message server (e.g., an instant messenger server) may assign the same ID to all corresponding messages of a particular chat session so as to transmit the message to all terminals of the chat session participants. For example, when a transmitting terminal transmits a chat message by a user, the chat message may be transferred to the message server 10. The message server 10 may then assign an ID to the chat message and forward the chat message together with the ID to a receiving terminal. The receiving terminal may receive the ID assigned by the message server and the chat message transmitted from the transmitting terminal. The same ID may be stored in the transmitting and receiving terminal. Therefore, the receiving terminal, when identifying the corresponding chat message, transfers an acknowledgement (ACK) of receipt signal to the message server. The message server may determine the ID of the corresponding message to provide, to the terminal, information as to whether a user has read the corresponding message.

The process of assigning the ID may vary depending on each of the terminals. For example, even if the transmitting terminal assigns an ID to a specific message, an ID assigned to a replying message by the receiving terminal may be different from that assigned by the transmitting terminal. The terminals may generate a unique ID assigned to a chat message, thereby supporting a function of designating a location of the chat message.

Furthermore, chat messages transmitted/received to/from other terminals may be arranged in a predetermined order. For example, the chat messages may be arranged in the order of time when they are created, or in the order in which they reach the message server 10. For example, when chat messages are arranged in the order of time, the terminals may identify time information recorded in a time field included in the chat messages, and arrange the chat messages in the order of time based on the time information to output the chat messages on a screen. When chat messages are arranged in the order in which they reach the message server 10, the terminals may identify the ID assigned by the message server 10 or information on the order of arrival configured by the server. On the basis of the information on the order of arrival, the terminals may arrange the chat messages in the order in which the chat messages are stored in the server and display the chat messages on a screen accordingly.

The terminals 100, 200, and 300 may change at least one of a time associated with the chat message, an order of arrival of the second chat message, and an identifier associated with the chat message in order to display the chat message within the context of a corresponding message. In one example, the chat messages may be rearranged so that two corresponding chat messages are displayed consecutively on the screen. This may allows a user to read the replying message within the context of the original message.

Figure 2:
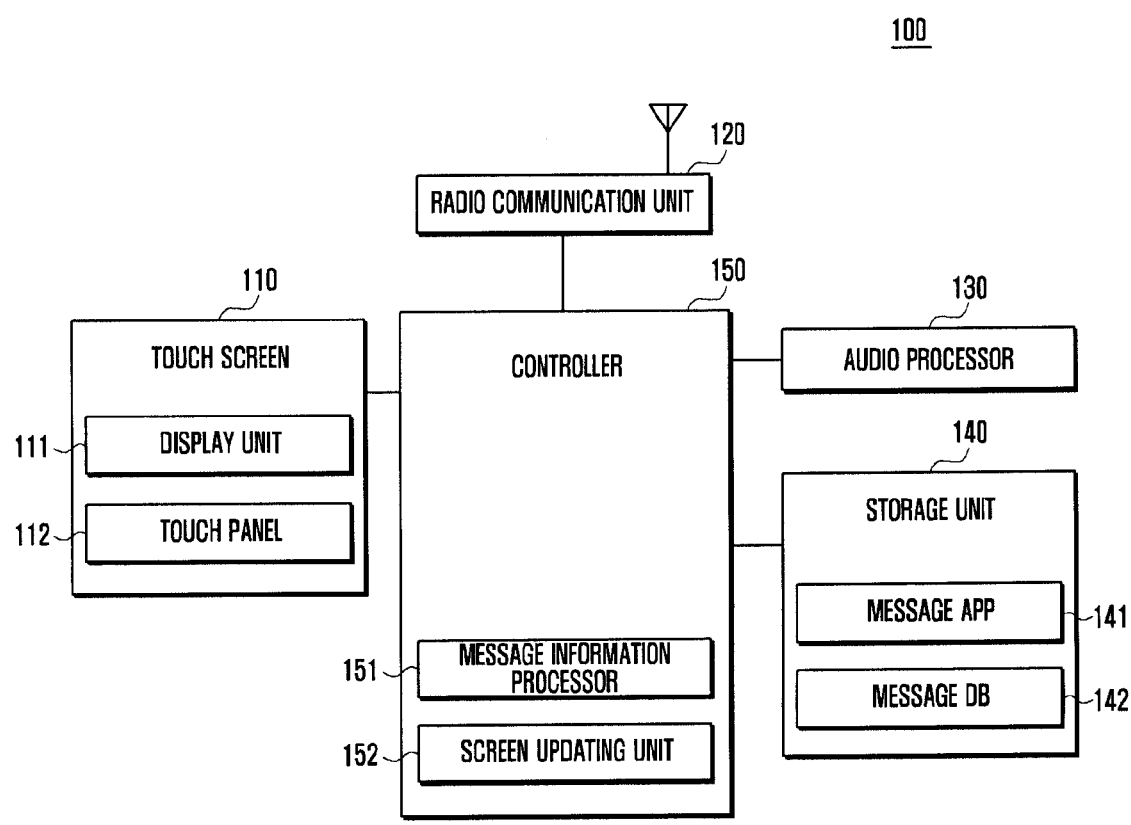
FIG. 2 is a block diagram illustrating an example configuration of a terminal in accordance with aspects of the present disclosure.

Referring to FIG. 2, an example terminal is shown. A terminal 100 may support a function of transmitting a chat message including information unique to the chat message. The unique information of the chat message may be used for designating a location of a reply to the chat message and for identifying a location in which to arrange the replying chat message. To this end, the terminal 100 may include a touch screen 110, a communication unit 120, an audio processor 130, a storage unit 140, and a controller 150.

The touch screen 110 may display screens in accordance with execution of user functions, and detects touch events related to control of the user functions. The touch screen 110 may include a display unit 111 and a touch panel 112. The display unit 111 may display various kinds of menus of the terminal, information input by a user, and information provided to the user. The display unit 111 may output various chat function screens in accordance with an operation of a chat function. For example, the display unit 111 may output a screen on which chat messages are arranged, a screen for creating a chat message, a screen for transmitting a chat message, a screen for receiving a chat message, a screen on which related chat messages are connected using a line, a screen for notifying of a presence of related chat messages, a screen on which chat messages are rearranged in accordance with a context, and the like. Furthermore, the display unit 111 may output a chat function screen including at least one chat message and a screen on which graphic processing is performed on the rearranged chat messages so that the rearranged chat messages are distinguished from other chat messages.

The touch panel 112 may sense a touch input of a user (e.g., a user gesture), and generates a touch event to transmit the generated touch event to the controller 150. The touch panel 112 may be configured with a touch sensor using a capacitive sensing technique, a resistive sensing technique, an infrared sensing technique, or the like, or a pressure sensor. The touch panel 112 may also be configured with various types of sensors which may sense contact or pressure of an object in addition to the aforementioned sensors. Here, the touch event may include information on touch coordinates (X, Y).

In one example, during an operation of a chat function, the touch panel 112 may determine effective touch areas for a plurality of keys included in a keypad window to support creation of a chat message in accordance with a touch input of a user. Furthermore, the touch panel 112 may generate various touch events in accordance with a user input signal for an arrangement of chat messages and transfer the generated touch events to the controller 150. For example, the touch panel 112 may generate an input signal for creating a chat message, an input signal for selecting a specific chat message, an input signal for identifying received chat information, an input signal for moving and arranging chat messages, and the like in accordance with a user input.

The communication unit 120 may carry out, for example, voice communication, video communication, data communication, and the like through a supportable mobile communication network and a communication channel under the control of the controller 150. The communication unit 120 may include a Radio Frequency (RF) transmitter that up-converts and amplifies the frequency of a transmitted signal, and an RF receiver that low-noise amplifies a received signal and down-converts a frequency of the received signal.

In another example, the communication unit 120 may establish a message service channel for an operation of a chat function. Here, the message service channel may be a service channel for transmitting/receiving various types of messages such as a short message, a multimedia message, an instant message, and the like. The communication unit 120 may support message transmission/reception during the operation of the chat function. The communication unit 120 may use address information of a terminal of at least one chat participant to transmit a chat message. The address information may be registered and managed in advance or in accordance with a new request and a user approval.

The audio processor 130 converts audio data such as voice input from the controller 150 into an analog signal to transmit the converted analog signal to a speaker (SPK), and converts audio data such as voice input from a microphone (MIC) into a digital signal to transfer the converted digital signal to the controller 150. The audio processor 130 may include a coder/decoder (codec). The codec may include a data codec for processing packet data and the like, and an audio codec for processing audio signals, such as voice and the like. The audio processor 130 converts the received digital audio signal into an analog signal through the audio codec to output the analog signal through the speaker. The audio processor 130 converts an analog audio signal input from the microphone into a digital audio signal through the audio codec to transfer the digital audio signal to the controller 150.

During the operation of the chat function, the audio processor 130 may output a sound effect for notifying of reception of chat information, a sound effect in accordance with a selection of chat information, and the like, and may support a function of outputting chat information with voice in accordance with user settings. Such a function may be omitted in accordance with the user settings.

The storage unit 140 stores at least one application required for a functional operation of the terminal, user data generated by a user, a message transmitted/received with a network, data in accordance with execution of applications, and the like. The storage unit 140 may include a program area and a data area. The program area may store an Operating System (OS) for booting the terminal and operating the aforementioned configurations, downloaded and installed applications, and the like. The data area is an area where data generated in accordance with use of the terminal 100 is stored.

The storage unit 140 may include a message application 141 (hereinafter, referred to as a message APP) for an operation of a chat function and a message DB 142. The message APP 141 may support generation, display, management, search, and the like of a chat message. The message Data Base (DB) may store chat messages generated in accordance with an operation of the message APP, information on a chat counterpart, information on a chat function screen, and the like.

The controller 150 may manage the overall operations of the terminal 100 and may manage signal flows between the internal configurations of the terminal 100, and performs a function of processing data. For example, the controller 150 may control the supply of power from a battery to the internal configurations of the terminal. The controller 150, when power is supplied thereto, may control a booting process of the terminal, and may execute various application programs, which are stored in the program area to execute functions of the terminal, in accordance with user settings.

In the present disclosure, the controller 150 may control various signal flows for supporting an operation of a chat function of the terminal 100. To this end, the controller 150 of may include a message information processor 151 and a screen updating unit 152.

The message information processor 151 may process and store related data generated in accordance with an operation of a chat function. The message information processor 151 may process data in accordance with creating, displaying, managing, and searching chat messages and transfer the processed data to the screen updating unit 152. The message information processor 151 may consolidate information unique to a message. Such information may include at least one of an identifier associated with a chat message, a time associated with a chat message, a recipient of the a chat message, and content of the chat message. Message information processor 151 may consolidate the unique information in a data field such that the unique information is transmitted with the message. The message information processor 151 may compare the arrangement order of chat messages based on the unique information of a specific chat message to rearrange the chat messages or alter a display of the chat message in accordance with the context of a corresponding message. The message information processor 151 may identify whether time information, ID information, and information on the order of arrival of chat messages have been changed and transfer the changed information to the screen updating unit 152. The screen updating unit 152 may configure a screen based on data transferred from the message information processor 151 and support an output of a chat function screen on the display unit 111. The screen updating unit 152 may output, on a screen, chat messages arranged based on at least one of time information, ID information, and information on the order of arrival such that the chat messages are rearranged in response to a change in the information thereof.

Referring to FIG. 3, an example signal flow is shown. A transmitting terminal 100 and a receiving terminal 200 may transmit and receive chat messages therebetween through a message server 10.

To this end, the transmitting terminal 100 and the receiving terminal 200 may be connected with the message server 10 through an authentication procedure in block 310. In block 320, the chat messages of the transmitting terminal 100 and the receiving terminal 200 may be transmitted through the message server 10 in real time. At this time, although the message server 10 may assign an ID to each chat message transmitted in real time and transmit the chat messages to the terminals, the present disclosure is not limited thereto. For example, the terminals may assign an ID to each of the chat messages, and manage and process the chat message based on the corresponding ID.

In block 330, the transmitting terminal 100 and the receiving terminal 200 output chat function screens to display units thereof, respectively, in which the chat messages are arranged in accordance with a pre-defined rule on each of the chat function screens. In this process, the chat messages of the transmitting terminal 100 may be arranged in the same order as those of the receiving terminal 200.

The transmitting terminal 100 and the receiving terminal 200 may arrange and output the chat messages in the order in which the chat messages are created or in the order in which the chat messages reach the message server 10. For example, when the chat messages are arranged in the order in which they are created, the terminals may extract time information from a time field included in the chat messages, and may output the chat messages in the time-based order on the basis of the extracted time information. When the chat messages are output in the order in which they reach the message server 10, the terminals may output the chat messages based on the ID included in the chat messages or information included in a field in which the order of arrival is recorded.

A user of the transmitting terminal 100 may wish to have the chat messages rearranged by context. In this instance, at block 331, the user may select at least one chat message or a first chat message displayed on the chat screen. Hereinafter, for convenience, a chat message used as a reference for rearranging another chat message may be the first chat message and the replying chat message that is rearranged in accordance with the first chat message may be the second chat message.

In block 332, the transmitting terminal 100 may detect an input of a second chat message while the first chat message is selected. In block 333, the transmitting terminal 100 may consolidate information unique to the first chat message into a data field. Here, the transmitting terminal may associate the data field with the second chat message based on at least one of an ID associated with the first chat message, a time associated with the first chat message, a recipient of the first chat message, and content of the first chat message.

In block 340, the transmitting terminal 100 may transmit the second chat message packet, that includes the data field, to the message server 10. Then, the message server 10 forwards the second chat message packet to the receiving terminal 200.

Upon receiving the second chat message, receiving terminal 200 may identify the unique information in the data field of the second chat message in block 351. The receiving terminal 200 may compare the unique information included in the second chat message with the unique information associated with each chat message stored therein to identify whether there is a chat message whose unique information matches the information in the data field.

In block 352, the receiving terminal 200 may rearrange a display of receiving terminal 200 such that the first chat message and the second chat message are displayed consecutively, when the data field comprises the information unique to the first chat message and a third chat message is displayed after the first chat message. That is, receiving terminal 200 may identify whether a third chat message is displayed after the first chat message an rearrange the messages accordingly allowing the user to easily identify the context of the second chat message.

After transmitting the second chat message, the transmitting terminal 100 may compare the order of arrangement of the information unique to the second chat message and information unique to other chat messages stored in the transmitting terminal in block 334. To this end, the transmitting terminal may change at least one of a time associated with the second chat message, an order of arrival of the second chat message, and an identifier associated with the second chat message based on the data field having the information unique to the first chat message.

In block 335, the transmitting terminal 100 may also rearrange the chat messages such that the first chat message and the second chat message are displayed consecutively, when a third chat message is displayed after the first chat message.

Hereinafter, methods of arranging chat messages will be described in detail from the perspective of the transmitting terminal and a receiving terminal. In performing a message based chat function, a terminal may carry out all configurations of the transmitting terminal and the receiving terminal.

Figure 4B:
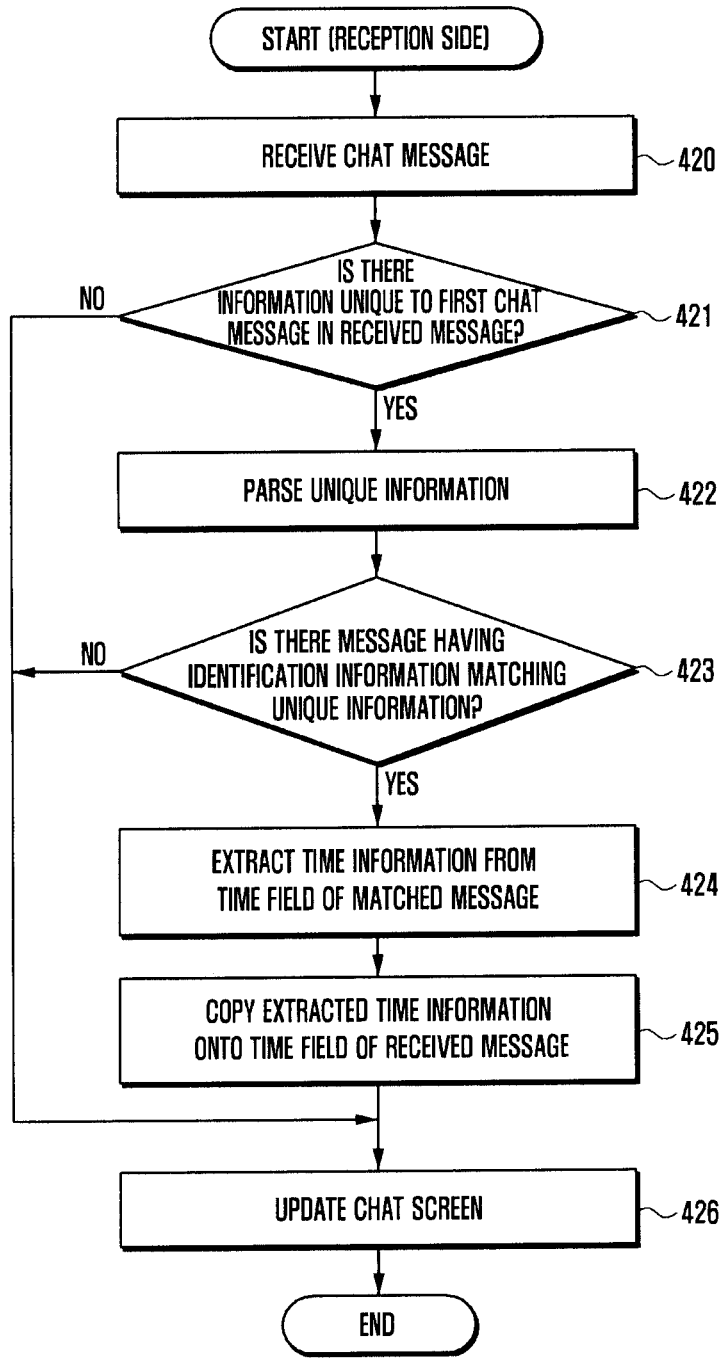

FIGS. 4A and 4B are flowcharts illustrating an example method of arranging messages in accordance with aspects of the present disclosure. FIG. 4A is a flowchart illustrating an example method of arranging messages by a transmitting terminal, and FIG. 4B is a flowchart illustrating an example method of arranging messages by a receiving terminal.

Referring to FIG. 4A, a terminal may support a function of arranging or rearranging chat messages in accordance with the time that the chat messages are created. First, in block 410, the transmitting terminal 100 may display a chat function screen, associated with operating a chat function, on a display unit 111 in accordance with a user control or a predetermined schedule. In this process, the transmitting terminal 100 may output one or more chat messages in the order of time, the chat messages being input by participants participating in the chat function. Here, the chat messages may include at least one of text, an image, a video, and an emoticon.

In block 411, the transmitting terminal 100 may detect a user input for selecting at least one first chat message from the chat messages output on the chat function screen. Here, the user input for selecting the first chat message may include a pre-defined touch gesture such as a touch, a tap, a long press, a sweep, or the like. A user, when desiring his/her chat messages to be located below a specific chat message, may select all the chat messages output on the screen as the first chat message.

In this process, the transmitting terminal 100 may perform graphic processing on at least one of a shape, a color, a size, and an effect of the selected first chat message such that the first chat message is distinguishable from other chat messages.

In block 412, the transmitting terminal 100 parses at least one of ID information, recipient information, and time information of the first chat message, and in block 413, determines whether an input of a second chat message is detected. Here, detection of the second chat message may include detecting the entry of a chat message and the pressing of a send button by a user.

In block 414, the transmitting terminal 100 consolidates information unique to the first chat message into a data field and includes the data field with the second chat message, and in block 415, transmits the second chat message including the data field. By way of example, when the first chat message is transmitted through an Instant Messenger (IM) server, the first chat message may include ID information assigned by the instant messenger server. The first chat message may include an ID field, a content field, and a time field. The ID field may include the ID assigned by the instant messenger server, the content field may include text information of a message, and the time field may include a time in which the message is created. The transmitting terminal 100 may consolidate the foregoing information into a data field of the second chat message and may transmit the second chat massage with the data field.

In one example, the second chat message, before being transmitted to the messenger server, may include the data field, the message itself, and the time of the second chat message. When being transmitted to the instant messenger server, the second chat message may include the data field, the message itself, the time, and the ID assigned to the second chat message by the server. Accordingly, the second chat message transmitted from the transmitting terminal 100 to the receiving terminal 200 may include the ID assigned to the second chat message by the server, the dat field with the information unique to the first message, the content of the second chat message, and the time of the second chat message.

When the first chat message is not transmitted through the instant messenger server, the transmitting terminal 100 may consolidate the information unique to the first chat message using at least one of at least one of an identifier associated with the first chat message, a time associated with the first chat message, a recipient of the first chat message, and content of the first chat message. Thereafter, the transmitting terminal 100 may perform an operation of rearranging the second chat message.

In block 416, the transmitting terminal 100 searches a message DB of the storage unit to discover a chat message including information matching the unique information in the data field of the second chat message, and in block 417, extracts time information from a time field included in the matched chat message. Here, the matched chat message may correspond to the first chat message. In block 418, the transmitting terminal 100 copies the time information of the first chat message onto the time field of the second chat message.

In one example, the transmitting terminal 100 may omit the searching process of block 416, and may also extract the time information from the time field of the selected first chat message to copy the extracted time information onto the time field of the second chat message. When the time field of the second chat message is changed, the transmitting terminal 100 may rearrange the chat messages in the order of time such that the first and second chat message are displayed consecutively in block 419. In one example, the second chat message is located below the first chat message.

Referring now to FIG. 4B, in block 420, the receiving terminal 200 may receive a chat message. Here, the chat message may be the second chat message including the information unique to the first chat message in the data field. The data field may be used to determine the location of the second chat message.

In block 421, the receiving terminal 200 determines whether the data field containing information unique to the first message is included in the received second chat message. When the unique information is not included in the received second chat message, the receiving terminal 200 may proceed to block 426 to update a chat function screen such that the chat function screen is arranged in accordance with the pre-defined rule.

When the unique information is included, the receiving terminal 200 may parse the unique information from the data field of the received second message in block 422, and determines whether there is a chat message whose unique information matches the unique information from the data field, in block 423. For example, the receiving terminal 200 may determine whether the chat message matching the unique information exists, by comparing the unique information in the data field of the received message with identification information, recipient information, and chat content information of the chat messages stored in the storage unit.

In block 424, the receiving terminal 200 extracts time information from a time field of the matched chat message (e.g., the first chat message). In block 425, the receiving terminal 200 copies the extracted time information onto a time field of the received second chat message.

When the time field of the received second message is changed, the receiving terminal 200 rearranges the chat messages in the order of time such that the received second chat message and the first chat message are displayed consecutively, in block 426. In one example, the second chat message is located below the matched first chat message.

Figure 5A:
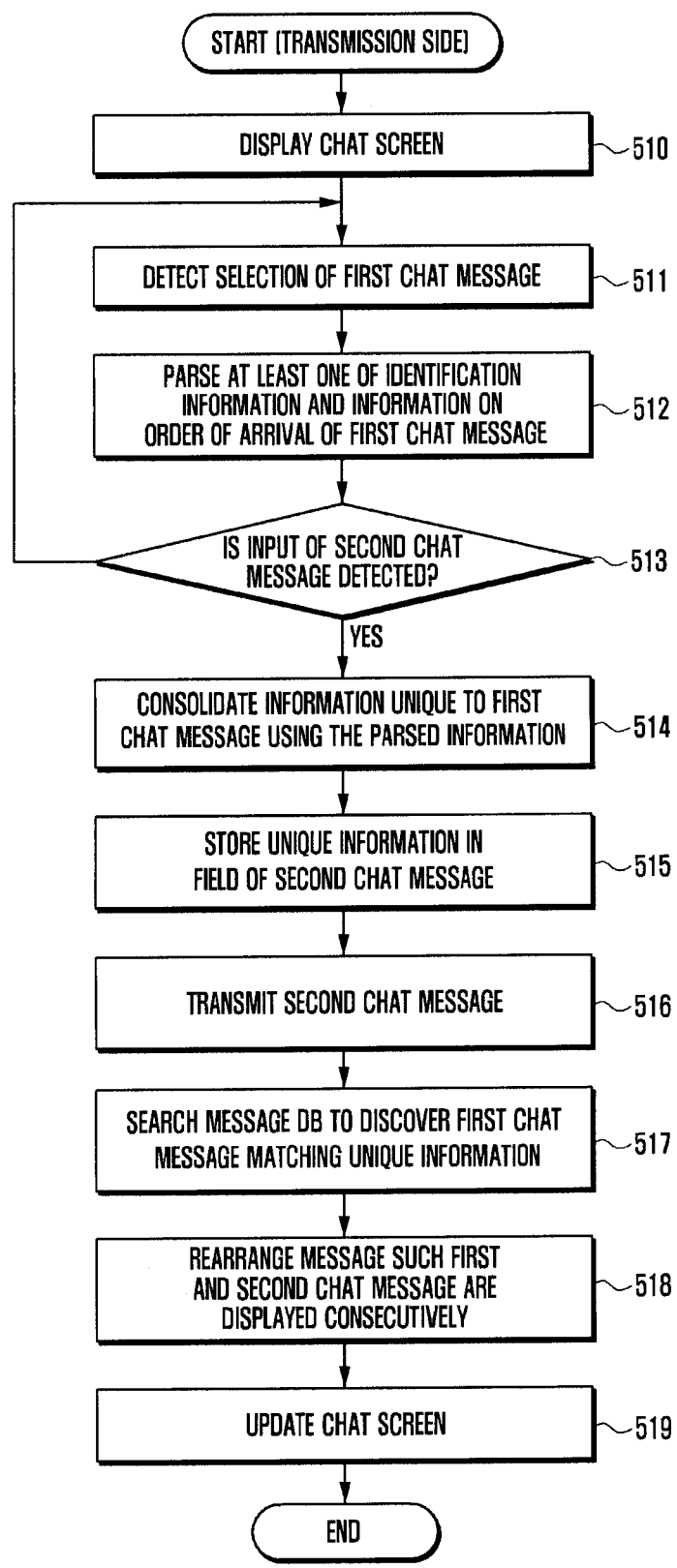
FIG. 5A and FIG. 5B are flowcharts illustrating other example methods of arranging messages in accordance with aspects of the present disclosure.
Figure 5B:
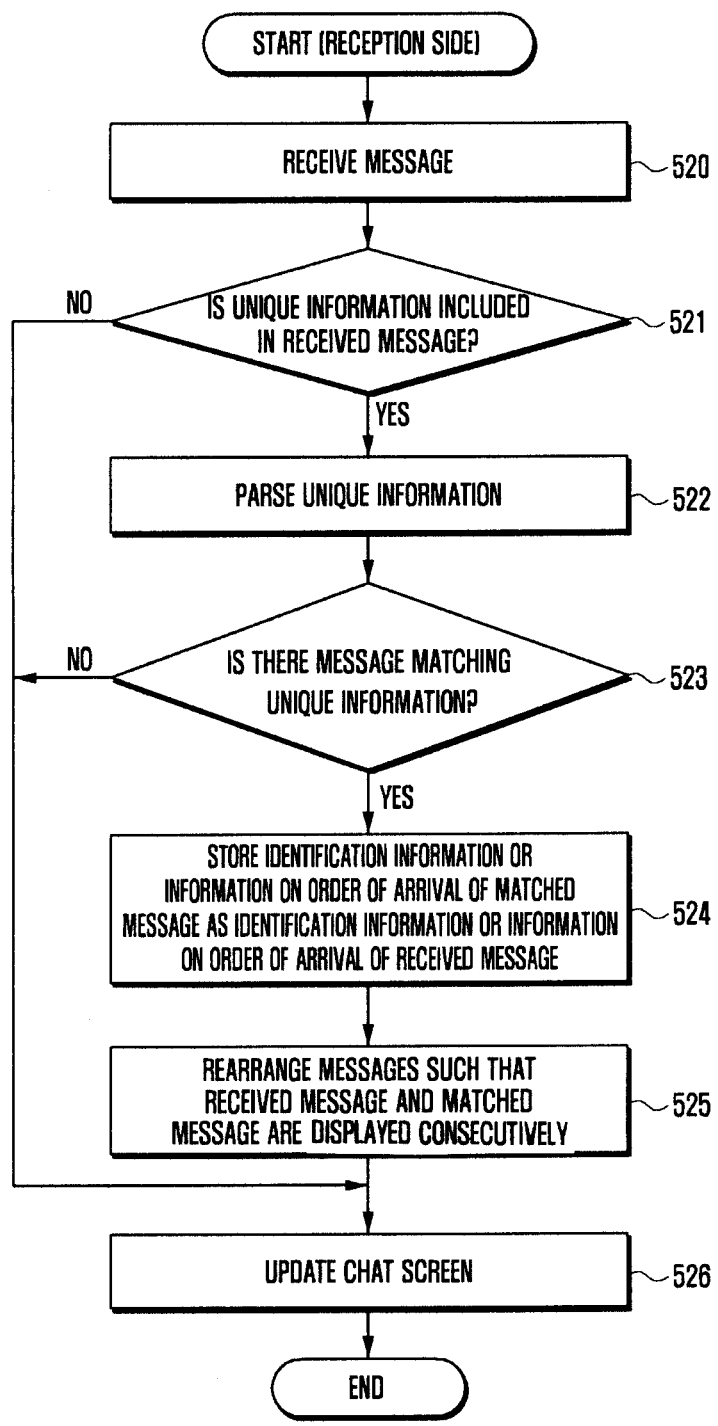

FIGS. 5A and 5B are flowcharts illustrating an example method of arranging messages in accordance with aspects of the present disclosure. A terminal may arrange or rearrange chat messages in accordance with the order in which the chat messages reach a server. When the chat messages are created while conforming to a rule by which ID assigned by the server increases in accordance with the order of arrival, the terminal may arrange or rearrange the chat messages based on the ID. Furthermore, when the chat message includes a reference field for providing information on the order of arrival to the server, the terminal may arrange or rearrange the chat messages based on the reference field.

First, in block 510, a transmitting terminal 100 may display a messenger based chat function screen on a display unit 111 in accordance with a user control or a predetermined schedule. In this process, the transmitting terminal 100 may output one or more chat messages input by participants participating in a chat function, based on the ID of the chat messages or the information on the order of arrival of the chat messages.

In block 511, the transmitting terminal 100 may detect a selection of at least one first chat message from the chat messages output on the chat function screen. In block 512, the transmitting terminal 100 parses at least one of the ID information and the information on the order of arrival of the first chat message, and in block 513, determines whether an input of a second chat message is detected.

In block 514, the transmitting terminal 100 consolidate information unique to the first chat message based on the parsed information. Since blocks 510 to 514 are identical to blocks 410 to 414 of FIG. 4A, a specific description thereof will be omitted.

In block 515, the transmitting terminal 100 stores the unique information in a data field of the second chat message. In this case, the reference field of the second chat message may store the ID information and the information on the order of arrival of the first chat message. For example, the ID information and the information on the order of arrival of the first chat message may be identical to those of the second chat message.

In block 516, the transmitting terminal 100 transmits the second chat message including the unique information. The transmitting terminal 100 may perform an operation of rearranging the first chat message and the second chat message so that they are displayed consecutively, if a third chat message is detected after the first chat message.

In one example, the transmitting terminal 100 searches through a message DB of the storage unit to discover a chat message matching the unique information of the second chat message in block 517, rearranges the chat messages such that the first and second chat message are displayed consecutively, when a third chat message is detected after the first chat message, in block 518, and updates the chat function screen in block 519.

Next, an operation of a receiving terminal transmitting a first chat message and receiving a second chat message will be described with reference to FIG. 5B.

In block 520, the receiving terminal 200 may receive a chat message (e.g., the second chat message). In block 521, the receiving terminal 200 determines whether information unique to another chat message (e.g., the first chat message) is included in the received message. When the unique information is not included in the received message, the receiving terminal 200 may proceed to block 526 to update a chat function screen such that the chat function screen is arranged in accordance with the pre-defined rule.

When the unique information is included in the received message, the receiving terminal 200 parses the unique information in block 522, and determines whether there is a chat message matching the unique information in block 523. For example, the receiving terminal 200 may determine whether the chat message matching the unique information exists, by comparing the unique information of the received message with ID information and information on the order of arrival (e.g., a reference field) of the chat messages stored in the storage unit.

In block 524, the receiving terminal 200 stores the ID information and the information on the order of arrival of the matched chat message as ID information and information on the order of arrival of the received message. In block 525, the receiving terminal 200 rearranges the chat messages such that the received message and the matched message are displayed consecutively, when a third message is displayed after the matched message, and in block 526, updates the chat function screen.

As described above, the terminal may allow the specific message to be rearranged and the chat function screen to be updated in both the transmitting terminal and the receiving terminal, when transmitting a specific message by designating a location of the message.

Figure 6:
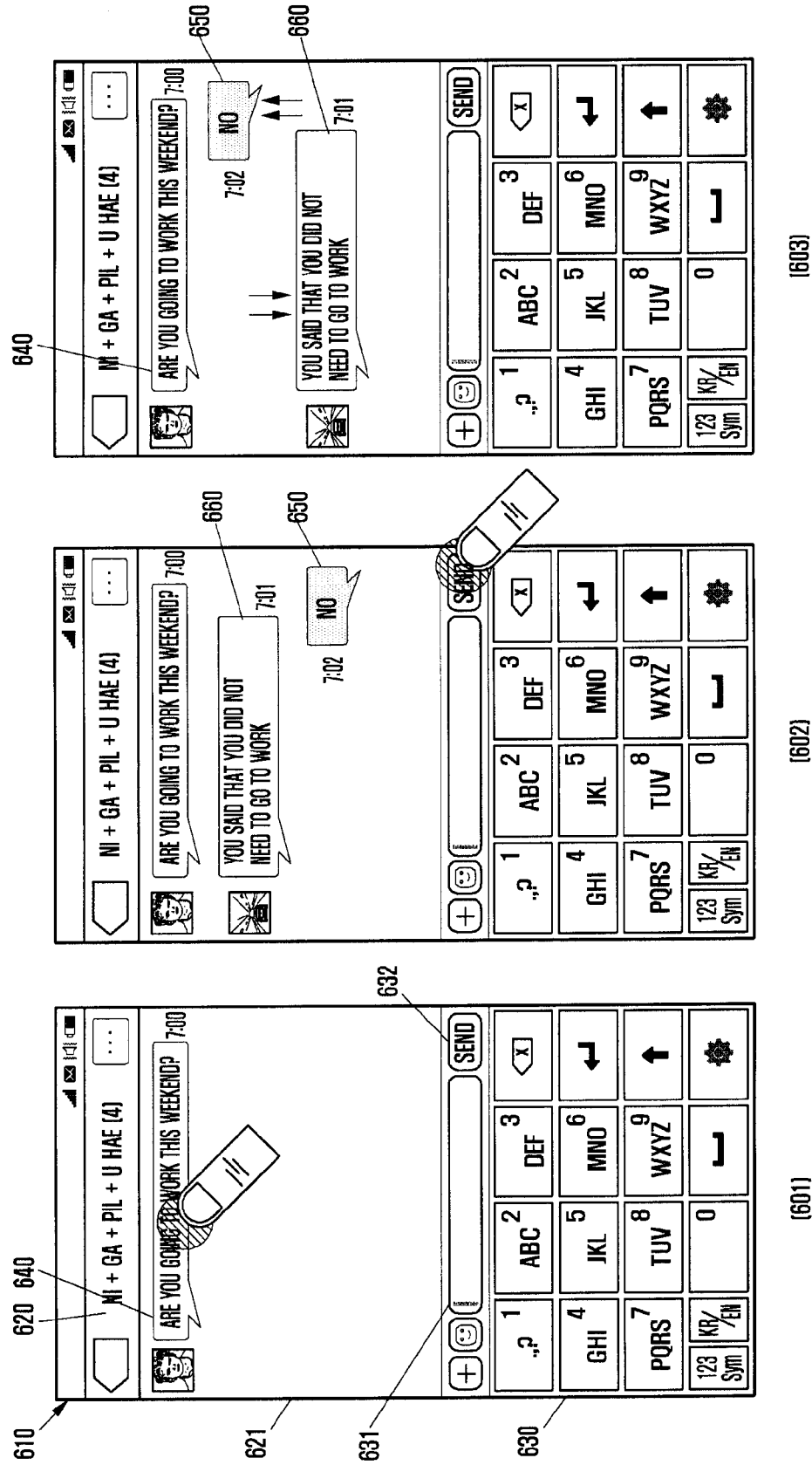
FIG. 6 illustrates is a working example of message arrangement in accordance with aspects of the present disclosure.

Referring to FIG. 6, an example of a message arrangement screen is shown. Terminals 100, 200, and 300, may output a chat function screen 610, when an input signal for activating a message based chat function is generated. For example, when an input signal for instructing execution of the message based chat function is generated or a chat message is received, the terminals 100, 200, and 300 may control the message based chat function to be activated.

On the chat function screen, one or more chat messages may be output in accordance with a predetermined rule, for example, an order in which the chat messages are created, or an order in which the chat messages reach a server. In this process, the terminals 100, 200, and 300 may identify whether a previous chat history exists, based on terminal information of chat participants. When the previous chat history exists, the terminals may control a screen including the previous chat history to be output. Furthermore, the terminals 100, 200, and 300 may display some registered chat messages on the chat function screen. The messages which are not output may be output in accordance with a user request, for example, a scroll input.

By way of example, the chat function screen 610 may include a chat group information display area 620, a chat window area 621, and a chat function menu area 630. The chat group information display area 620 is an area where identification information of chat participants included in a chat group and the number of participants are displayed, and the chat window area 621 is an area where chat messages between the chat participants are arranged and output in accordance with the pre-defined rule. Here, the chat messages may be displayed, including transmission messages transmitted to other terminals and reception messages received from other terminals, and each of the chat messages may be out in the form of a speech bubble. Furthermore, the reception messages may be configured to output thumbnail images of individual users and identification information of counterparts together. A user may visually recognize information on other users participating in the chat, through the thumbnail images and the identification information of the counterparts. The chat function menu area 630 may include a message input window 631 and a sending menu 632. The terminals may be configured to output a keypad window for inputting a message when a user input for selecting the message input window is detected.

By way of example, it is assumed that a chat function is performed by four chat participants in a message group, and a screen in accordance with performing the chat function by the chat participants will be described.

As illustrated in [601] of FIG. 6, a user may recognize that a first chat message 640 has been received. The user may select the first chat message 640 to designate a location of a second chat message responding to the first chat message on the chat message screen. The terminal may be configured such that a speech bubble corresponding to the first chat message included in the chat function screen may be selected. In this process, the terminal may perform graphic processing on a color, a shape, an effect, and the like of the first chat message to visually distinguish the selected first chat message from other chat messages.

In succession, as illustrated in [602] of FIG. 6, the user may compose a second chat message 650 (e.g., "No") and transmit the composed second chat message 650 to reply to the first chat message 640 (e.g., "Are you going to work this weekend?") displayed on the chat function screen.

Meanwhile, while the chat function is being operated, a third chat message 660 by another counterpart participating in the message group may be displayed between the first chat message 640 and the second chat message 650 as illustrated in [602] of FIG. 6. Due to the receipt of third chat message 660, the chat messages are ordered based on the time in which each message was received, and therefore, it may be difficult to appreciate the context between the chat messages.

The terminal may identify that the second chat message is associated with the first chat message, and as illustrated in [603] of FIG. 6, rearrange the chat messages such that the second chat message 650 is located below the first chat message 640, when the third chat message 660 is detected.

For example, the terminal may process the second chat message 650 such that unique information related to the first chat message 640 is included in the second chat message 650, search the chat messages based on the unique information, identify a location of the second chat message to rearrange the chat messages in the time order or in the order in which the chat messages have reached the server, and update the chat function screen.

Meanwhile, when a new chat message is output, the terminal may display a screen as illustrated in [602] of FIG. 6 before outputting a screen on which the chat messages are rearranged as illustrated in [603] of FIG. 6. At this time, the terminal may perform graphic processing on at least one of a color, a shape, and an effect of the chat messages such that the rearranged chat message is distinguished from other chat messages which have not been rearranged.

Furthermore, when a message is rearranged in accordance with time information, the terminal may perform graphic processing on the time information such that the time information is distinguished from other chat messages, or may display a time before or after the rearrangement together.

Figure 7:
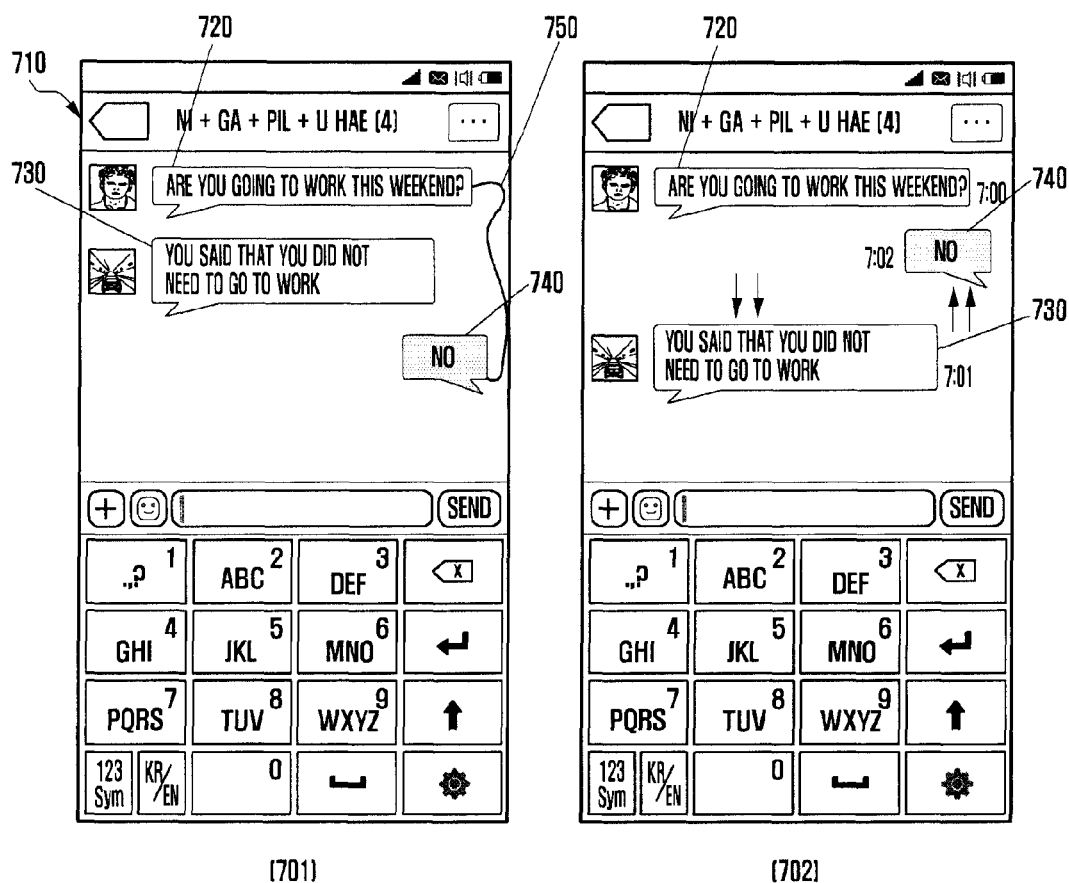
FIG. 7 illustrates is a further working example of message arrangement in accordance with aspects of the present disclosure.

FIG. 7 illustrates an example of a message arrangement screen in accordance with aspects of the present disclosure. A terminal may display, on a chat function screen 710, graphic effects notifying that a plurality of pieces of chat information are associated with each other.

A user, after receiving a first chat message 720, may input and transmit a second chat message 740. Based on the second chat message and unique information, the terminal may identify that the second chat message is associated with the first chat message.

As illustrated in [701] of FIG. 7, a display unit 111 may perform graphic processing such that the first chat message and the second chat message are connected through a line 750 and output the messages under the control of a controller, when a third chat message 730 is detected after the first chat message 720. Furthermore, when a plurality of first chat messages 720 and second chat messages 740 are related to each other and displayed on the chat function screen 710, the terminal may output multiple lines connecting the associated chat messages. When one or more lines are output on the chat function screen, the terminal may perform graphic processing on at least one of a shape, a color, and a thickness of the lines to output the lines such that the lines may be distinguished from each other.

While the chat messages are connected through the line 750, the terminal may rearrange the chat messages in response to a user control input as illustrated in [702] of FIG. 7. For example, the second chat message 740 connected with the first chat message 720 through the line 750 on the screen illustrated in [701] of FIG. 7 may be rearranged to be located below the first chat message 720 on the screen illustrated in [702] of FIG. 7, in which case the location of the second chat message 740 may be exchanged with that of the third chat message 730.

Figure 8:
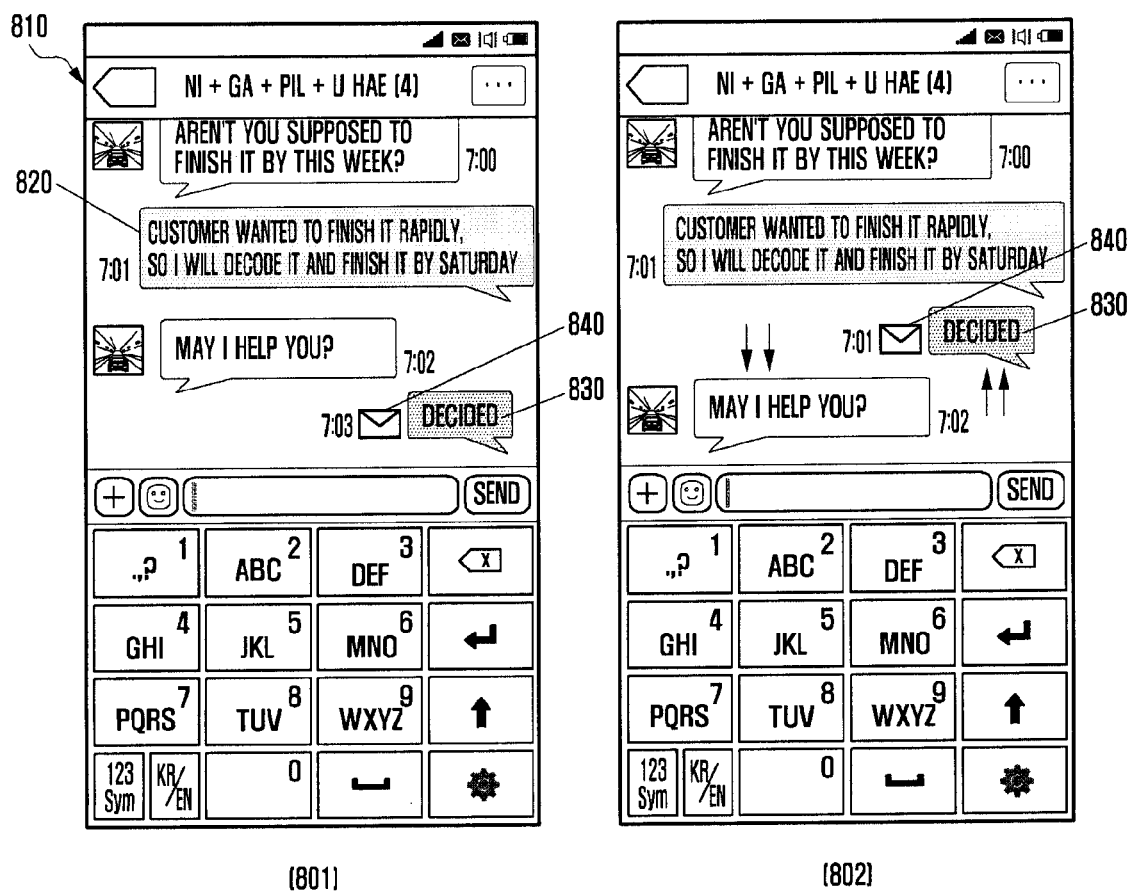
FIG. 8 illustrates yet another working example of message arrangement in accordance with aspects of the present disclosure.

FIG. 8 illustrates an example message arrangement screen in accordance with aspects of the present disclosure. When a second chat message associated with a first chat message is present, a terminal may display an icon associated with the second chat message on a chat function screen. Here, when a second chat message including information unique to a first chat message is received, the icon may be displayed together with the second chat message. However it is understood that the example of FIG. 8 is merely illustrative and that other notifications besides an icon may be used and that the notification does not have to be displayed together with the second chat message.

Furthermore, when a selection of the icon is detected, the terminal may may rearrange the chat messages such that the associated first and second chat messages are displayed consecutively, when a third chat message is displayed after the first chat message. For example, when a user finds a typing error after transmitting a message, the user may transmit a corrected message for the typing error at a predetermined time interval. If other messages are displayed while the corrected message is being transmitted, the user may not be able to identify which message is associated with the corrected message. In this case, the user may select the related message and then transmit the corrected message.

In a further example, as illustrated in [801] of FIG. 8, the terminal may display a icon 840 that indicates the presence of a second chat message associated with a first chat message. The icon 840 is shown being displayed on chat function screen 810. The icon may include information regarding the location in which the first chat message 820 is arranged, based on the unique information associated with first chat message 820.

The user may select the notification icon when the user has difficulty appreciating the context of the corresponding message or when the user wishes to know which message the corresponding message is replying to.

For example, when there is a typing error in the first chat message 820 transmitted at 7:01, the user may transmit a corrected message 830 for revising the typing error at 7:03. The user may select the notification icon such that the corrected message transmitted at 7:03 is associated with the message transmitted at 7:01.

In response to the user input for selecting the notification icon, as illustrated in [802] of FIG. 8, the terminal may rearrange the messages such that the corrected message 830 is located below the first chat message 820.

Advantageously, the present disclosure provides a method and device for rearranging chat messages so that related messages are displayed consecutively. Incoming chat messages related to previously entered messages may be displayed consecutively so that users can easily determine the context of the messages. In turn, a burdensome search through all chat messages may be avoided.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. A method of arranging messages with a chat function, the method comprising:
   detecting a selection of a first chat message displayed on a chat screen;
   consolidating unique information into a data field of the first chat message;
   generating a second chat message in reply to the first chat message such that the second chat message contains the data field including the unique information of the first chat message; and
   rearranging a display of chat messages based on the unique information of the first chat message being included in the data field of the second chat message such that the first chat message and the second chat message are displayed consecutively, when a third chat message is displayed after the first chat message.

2. The method of claim 1, further comprising:
   changing at least one of a time associated with the second chat message, an order of arrival of the second chat message, and an identifier associated with the second chat message based on the data field so as to enable the first chat message and second chat message to be displayed consecutively.

3. The method of claim 1, wherein the unique information of the first chat message comprises at least one of an identifier associated with the first chat message, a time associated with the first chat message, a recipient of the first chat message, and content of the first chat message.

4. The method of claim 3, wherein the identifier associated with the first chat message is assigned to the first chat message or the identifier comprises an order in which the first chat message reaches a server.

5. The method of claim 1, wherein rearranging the display of chat messages further comprises:
   displaying an icon associated with the second chat message; and
   rearranging the display of chat messages, when selection of the icon is detected and the third chat message is displayed after the first chat message.

6. The method of claim 1, further comprising displaying a line connecting the first chat message with the second chat message.

7. The method of claim 1, wherein rearranging the display of the second chat message further comprises using graphic processing on at least one of a shape, a color, a size, and an effect of the second chat message such that the second chat message is distinguishable from other chat messages or by changing a time associated with the second chat message.

8. A method of arranging messages with a chat function, the method comprising:
   displaying a first chat message;
   detecting receipt of a second chat message;
   identifying whether a data field of the second chat message comprises unique information of the first chat message;
   identifying whether a third chat message is displayed after the first chat message; and
   rearranging a display of chat messages based on the unique information of the first chat message being included in the data field of the second chat message such that the first chat message and the second chat message are displayed consecutively, when the data field comprises the information unique to the first chat message and the third chat message is displayed after the first chat message.

9. The method of claim 8, wherein the unique information of the first chat message comprises at least one of an identifier associated with the first chat message, a time associated with the first chat message, a recipient of the first chat message, and content of the first chat message.

10. The method of claim 8, wherein the display of the first chat message and the second chat message is rearranged based on at least one of a time associated with the first chat message, an order of arrival of the first chat message, and an identifier associated with the second chat message.

11. A device for supporting a message based chat function, the device comprising:
    at least one processor to:
    detect a selection of a first chat message displayed on a chat screen;
    consolidate unique information a data field of the first chat message;
    generate a second chat message in reply to the first chat message such that the second chat message contains the data field including the unique information of the first chat message; and
    rearrange a display of chat message based on the unique information of the first chat message being included in the data field of the second chat message such that the first chat message and the second chat message are displayed consecutively, when a third chat message is displayed after the first chat message.

12. The device of claim 11, wherein the at least one processor to change at least one of a time associated with the second chat message, an order of arrival of the second chat message, and an identifier associated with the second chat message based on the data field so as to display the first chat message and second chat message consecutively.

13. The device of claim 11, wherein the unique information of the first chat message comprises at least one of an identifier associated with the first chat message, a time associated with the first chat message, a recipient of the first chat message, and content of the first chat message.

14. The device of claim 13, wherein the identifier associated with the first chat message is assigned to the first chat message or the identifier comprises an order in which the first chat message reaches a server.

15. The device of claim 11, wherein to rearrange the display of chat messages the at least one processor to:

display an icon associated with the second chat message; and rearrange the display of chat messages, when selection of the icon is detected and the third chat message is displayed after the first chat message.

16. The device of claim 11, wherein the at least one processor to display at least one of a line connecting the first chat message with the second chat message or a notification indicating a presence of the second chat message.

17. The device of claim 11, wherein to rearrange the display the at least one processor to use graphic processing on at least one of a shape, a color, a size, and an effect of the second chat message such that the second chat message is distinguishable from other chat messages or to change a time associated with the second chat message.

18. The device of claim 11, wherein the at least one processor to use graphic processing on at least one of a shape, a color, a size, and an effect of the first chat message such that the first chat message is distinguishable from other chat messages, when selection of the first chat message is detected.

19. A device for supporting a message based chat function, the device comprising:
at least one processor to:
display a first chat message;
detect receipt of a second chat message;
identify whether a data field of the second chat message comprises unique information of the first chat message;
identify whether a third chat message is displayed after the first chat message; and
rearrange a display of chat messages by the device based on the unique information of the first chat message being included in the data field of the second chat message such that the first chat message and the second chat message are displayed consecutively, when the data field comprises the information unique to the first chat message and the third chat message is displayed after the first chat message.

20. The device of claim 19, wherein the at least one processor to search for the first chat message based on the data field containing unique information of the first chat message.

* * * * *